US012664447B2

(12) United States Patent (10) Patent No.: US 12,664,447 B2
Ferreira et al. (45) Date of Patent: Jun. 23, 2026

(54) ROBUST MULTI-MODEL EVENT DETECTION WITH UNRELIABLE SENSORS

(71) Applicant: Dell Products L.P., Round Rock, TX (US)

(72) Inventors: Paulo Abelha Ferreira, Rio de Janeiro (BR); Vinicius Michel Gottin, Rio de Janeiro (BR); Pablo Nascimento da Silva, Niterói (BR)

(73) Assignee: Dell Products L.P., Round Rock, TX (US)

( * ) Notice: Subject to any disclaimer, the term of this patent is extended or adjusted under 35 U.S.C. 154(b) by 803 days.

(21) Appl. No.: 17/938,299

(22) Filed: Oct. 5, 2022

(65) Prior Publication Data

US 2024/0119320 A1 Apr. 11, 2024

(51) Int. Cl.
*G06N 20/00* (2019.01)
*G06F 17/16* (2006.01)
*G06N 5/045* (2023.01)
(52) U.S. Cl.
CPC ............. *G06N 5/045* (2013.01); *G06F 17/16* (2013.01); *G06N 20/00* (2019.01)

(58) Field of Classification Search
None
See application file for complete search history.

(56) References Cited

U.S. PATENT DOCUMENTS

| | | | | |
|---|---|---|---|---|
| 2017/0286860 A1* | 10/2017 | Chen | .................. | G06N 3/08 |
| 2020/0174433 A1* | 6/2020 | Hughes | ............... | G06F 16/212 |
| 2021/0174249 A1* | 6/2021 | Hernandez Herranz | ................. | |
| | | | | G06N 20/00 |
| 2021/0216076 A1* | 7/2021 | Nayak | ................. | G06N 20/20 |
| 2021/0287111 A1* | 9/2021 | Zhou | ................. | G06Q 30/016 |
| 2022/0237063 A1* | 7/2022 | Giddings | ............. | G06F 11/321 |
| 2022/0374274 A1* | 11/2022 | Chen | ................. | G06F 11/3447 |
| 2023/0144585 A1* | 5/2023 | Asthana | ............ | G06F 9/44536 |
| | | | | 706/12 |
| 2023/0239658 A1 | 7/2023 | Gottin et al. | | |

OTHER PUBLICATIONS

U.S. Appl. No. 17/663,423, filed May 14, 2022, Gottin, et al.

* cited by examiner

*Primary Examiner* — Xuyang Xia
(74) *Attorney, Agent, or Firm* — Workman Nydegger

(57) ABSTRACT
Model selection is disclosed. Features used as inputs to models are scored in terms of importance and health. The importance and health scores are combined in order to generate a model score for each model. The model with a score above a threshold score is selected and deployed.

20 Claims, 8 Drawing Sheets

| | $f_1$ | $f_2$ | ... | $f_j$ | $x$ | $y$ | $z$ | $g_1$ | $g_2$ | ... | $g_k$ | $h_1$ | $h_2$ | ... | $h_l$ | $\alpha$ | $\beta$ | $\gamma$ | Total |
|---|---|---|---|---|---|---|---|---|---|---|---|---|---|---|---|---|---|---|---|
| $M_1$ | 0.2 | 0.2 | | | 0.1 | 0.1 | 0.1 | 0.1 | 0.3 | | | 0.2 | 0.1 | | | 0.3 | | | 1.0 |
| $M_2$ | | | | | | | | | | | | | | | | 0.1 | 0.2 | | 1.0 |
| ... | | | | | | | | | | | | | | | | | | | ... |
| $M_N$ | | | | | | | | | | | | | | | | | | | 1.0 |

Table 220

Determine Feature Importance Scores
302

Determine Feature Health Scores
304

Determine Model Scores (Aggregated Scores)
306

Select Model for Deployment and Deploy Selected Model
308

400

| Memory<br>402 | | Storage Media<br>408 |
| NVRAM<br>404 | | UI Device<br>410 |
| Processor<br>406 | | Data Storage<br>412 |
| Application(s)<br>414 | | |

ROBUST MULTI-MODEL EVENT DETECTION WITH UNRELIABLE SENSORS

FIELD OF THE INVENTION

Embodiments of the present invention generally relate to machine learning based event detection. More particularly, at least some embodiments of the invention relate to systems, hardware, software, computer-readable media, and methods for event detection in an edge environment with multiple sensors.

BACKGROUND

When objects operating in an environment are autonomous, and for other reasons, there is often a desire to detect events that may occur or are occurring in the environment. For example, it may be beneficial to detect a potential collision between two objects or detect when an object is turning in a dangerous manner. Detecting events allows remedial or corrective actions to be performed and may prevent adverse consequences.

When providing smart services, such as detecting events, the autonomy of autonomous objects operating in an environment impacts the ability to detect events. Unfortunately, the ability to successfully detect events in such an environment is often hampered by the fact that some of the data used to detect events may be compromised, noisy, fault, missing, or invalid. Unreliable data from these sources can adversely impact the ability to detect events in an environment.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which:

FIG. 2B discloses aspects of determining feature importance;

DETAILED DESCRIPTION OF SOME EXAMPLE EMBODIMENTS

Figure 1A:
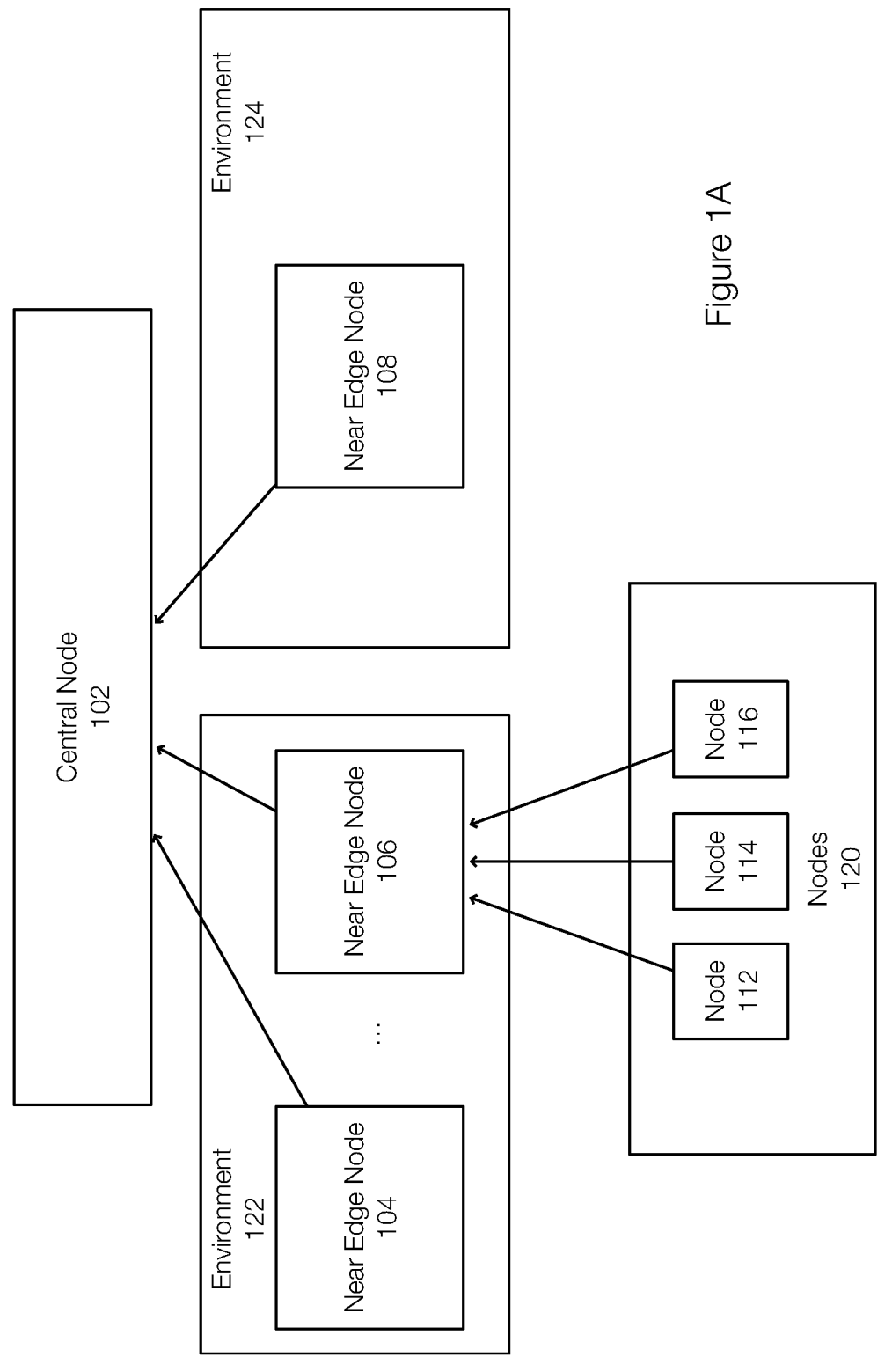
FIG. 1A discloses aspects of nodes operating in environments.

Embodiments of the present invention generally relate to logistics and logistics operations. More particularly, at least some embodiments of the invention relate to systems, hardware, software, computer-readable media, and methods for selecting and deploying models used in performing logistics operations.

Logistics operations in an environment, including environments that include autonomous objects such as robots or forklifts, are often performed using data generated in the environment. For example, sensors associated with an object operating in the environment may generate data such as position data, inertial data, video data, or the like, although similar data may also come from other objects or sources in the environment. This data can be provided as input to a machine learning model, which generates inferences therefrom. More specifically, features may be extracted from the sensor or other data and input to the machine learning model.

For example, a model may be trained to detect dangerous cornering events (or other events) based on trajectory data such as data from inertial sensors, proximity sensors, position sensors, or the like. The output of the model may be a probability that a dangerous cornering event is occurring. If the model determines that a dangerous cornering event is occurring, the output of the model allows the object to take corrective actions such as slowing down or changing its trajectory. More specifically, an autoencoder may be trained with normative cornering data. When a reconstruction error of the autoencoder is greater than a threshold, a non-normative event, such as a dangerous cornering event, is detected.

More generally, a factory, warehouse, or other environment may include multiple mobile objects that may operate autonomously. The logistics and other tasks performed by or for these objects may depend on data from multiple sensors. Data from the sensors may also be used to construct datasets that can be used for machine learning training and inference.

However, some of these sensors (or data sources) may malfunction, be nonresponsive, be faulty, or be noisy. As a result, any features generated or constructed from the data generated by or collected from these sensors may lead to poor performance (e.g., poor model performance) and may incur high costs. Performing an action based on faulty data, more example, may ironically cause an adverse consequence that would otherwise have been avoided.

As a result, it is useful to have data or features that are valid and useful. Embodiments of the invention may generate scores on a per-feature basis. Further, different models may be trained using different subsets of the available features. This allows models to be selected based on the scores of the features used as inputs to the models. More specifically, scoring the features allows the models to be scored as well and embodiments of the invention can select the best scoring models for deployment to nodes in the environment.

Advantageously, unreliable sensors and/or features can be detected, identified, and/or excluded from event detection. This allows models to be intelligently selected or weighed. The inferences of the models can be weighed, in one example, and the trust in the inference can be treated accordingly. For example, decisions based on less-trusted models may require a higher threshold level or probability output. Advantageously, features that are faulty or unavailable can be excluded from model training in some instances. If the feature later becomes reliable, the models can be retrained.

Embodiments of the invention may train multiple models, which may have the same and/or different purposes, with different sets of features. In some embodiments, each feature may be associated with a health score and/or an importance score. The health score and the importance score can be combined into an aggregated score for each feature. The aggregated scores of the features can be combined to generate a model score.

The model score may be used to select which models should be deployed. For example, two models may both perform the same event detection, while relying on different features or different sets of features. The model deployed may be the model with the best aggregated feature scores or the best model score. This allows for robust event detection in dynamic environments with unreliable sensors.

Embodiments of the invention relate to event detection with multiple sensors where a number of these sensors may be unreliable (e.g., faulty, malfunction, fail to respond, or noisy).

Objects operating in an environment may include mobile, movable, and/or stationary objects. These objects may include hardware such as processors, memory, networking hardware, and the like. The type of hardware associated with a specific object may depend on the object. A pallet, for example, may only include an RFID tag that can be read by an RFID reader. The hardware, and any agents or models or other software operating thereon, may be referred to as a node. Reference to a node may refer to the hardware and/or the object as a whole.

FIG. 1A discloses aspects of environments in which selected models are trained and deployed to nodes in the environment. FIG. 1A illustrates an environment 122 and an environment 124. The environments 122 and 124 may be warehouses, factories, stores, or the like. The environments 122 and 124 may be associated with the same entity or with different entities. The environment 122 is associated with at least one near edge-node, represented by a near edge node 104 and a near edge node 106. The environment 124 includes near edge node 108.

Each of the near edge nodes may be associated with a group or set of nodes (objects in the environment). The near edge node 106 is associated with nodes 120, which includes the nodes 112, 114, and 116. These nodes 120 are examples of far-edge nodes. Generally, the near edge node 106 includes more powerful computing resources than the nodes 120.

A central node 102 may also be included or available. The central node 102 may operate in the cloud and may communicate with multiple near edge nodes associated with multiple environments. However, the central node 102 may not be necessary. Thus, the near edge node 106 may be a central node from the perspective of the nodes 120. Alternatively, the nodes 120 may communicate directly with the central node 102.

Figure 1B:
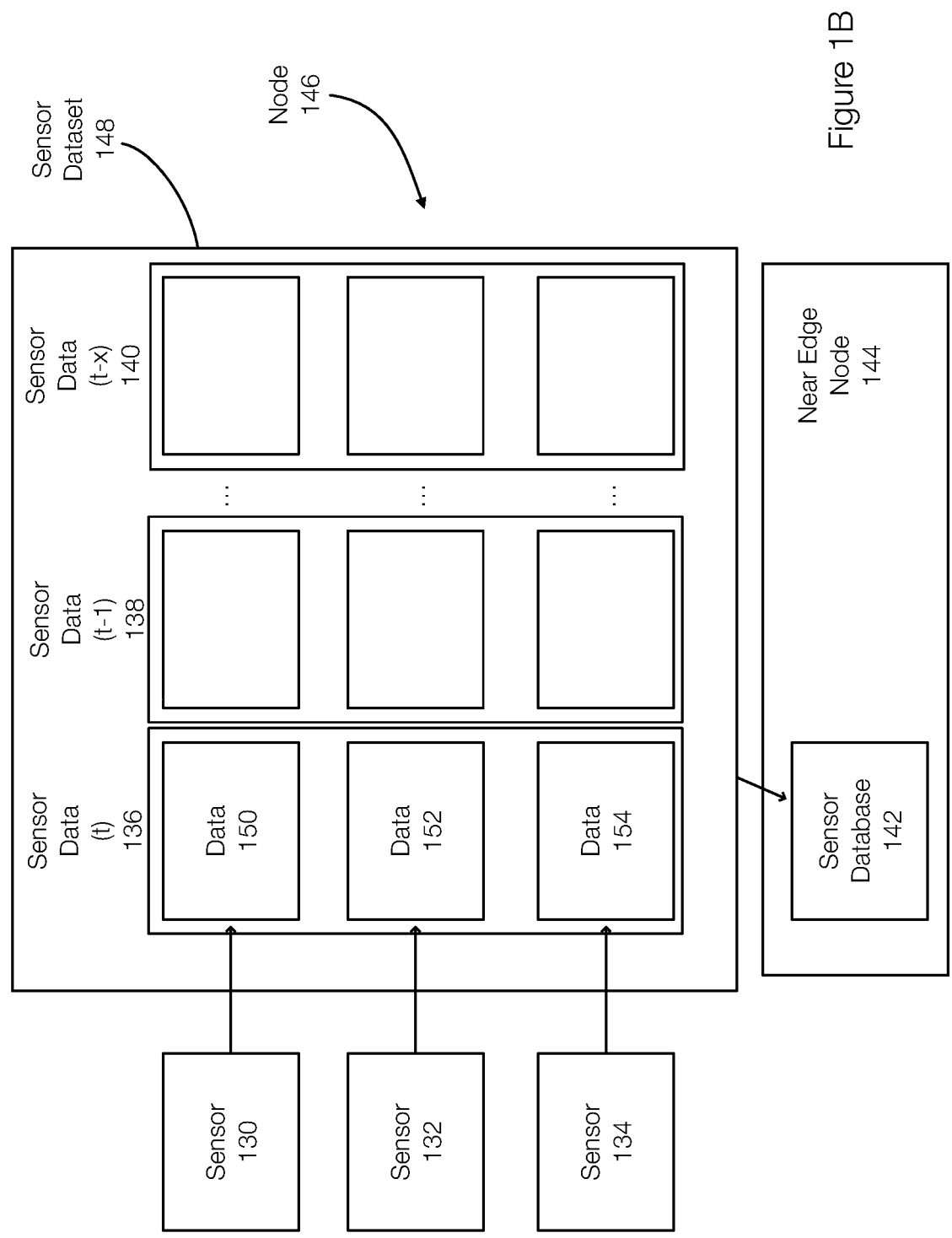
FIG. 1B discloses aspects of data generated at and collected from nodes in an environment.

FIG. 1B discloses aspects of data generated at or collected from a node. The node 146 (an example of the nodes 120) may include or be associated with sensors 130, 132, and 134. The sensors 130, 132, and 134 may include inertial sensors, position sensors, load sensors, direction sensors, proximity sensors, or the like or combinations thereof. These sensors 130, 132, and 134 generate, respectively, data 150, 152, and 154.

In one example, data is generated and collected as collections 136, 138, and 140. Thus, the collection 136 is a set of sensor data generated or collected at time t. The sensor data 138 was collected at time t−1 and the sensor data 140 was collected at time t−x. The sensor dataset 148, which includes one or more collections, may be stored at least temporarily at the node 146 and is transmitted to the near edge node 144 and stored in a sensor database 142. The sensor dataset 148 may be limited to x collections in some embodiments. The sensor database 142 may store sensor data from multiple nodes in an environment. The sensor database 142 may store data for longer periods of time.

For example, sensor data (inertial, proximity, position) related to an object's trajectory can be used to predict a dangerous cornering event or a potential collision when input to a trained machine learning model. In one example, if each collection corresponds to a position, multiple collections can be used as input to a model, which may then generate an inference as to whether or not the trajectory is a dangerous cornering event.

Figure 1C:
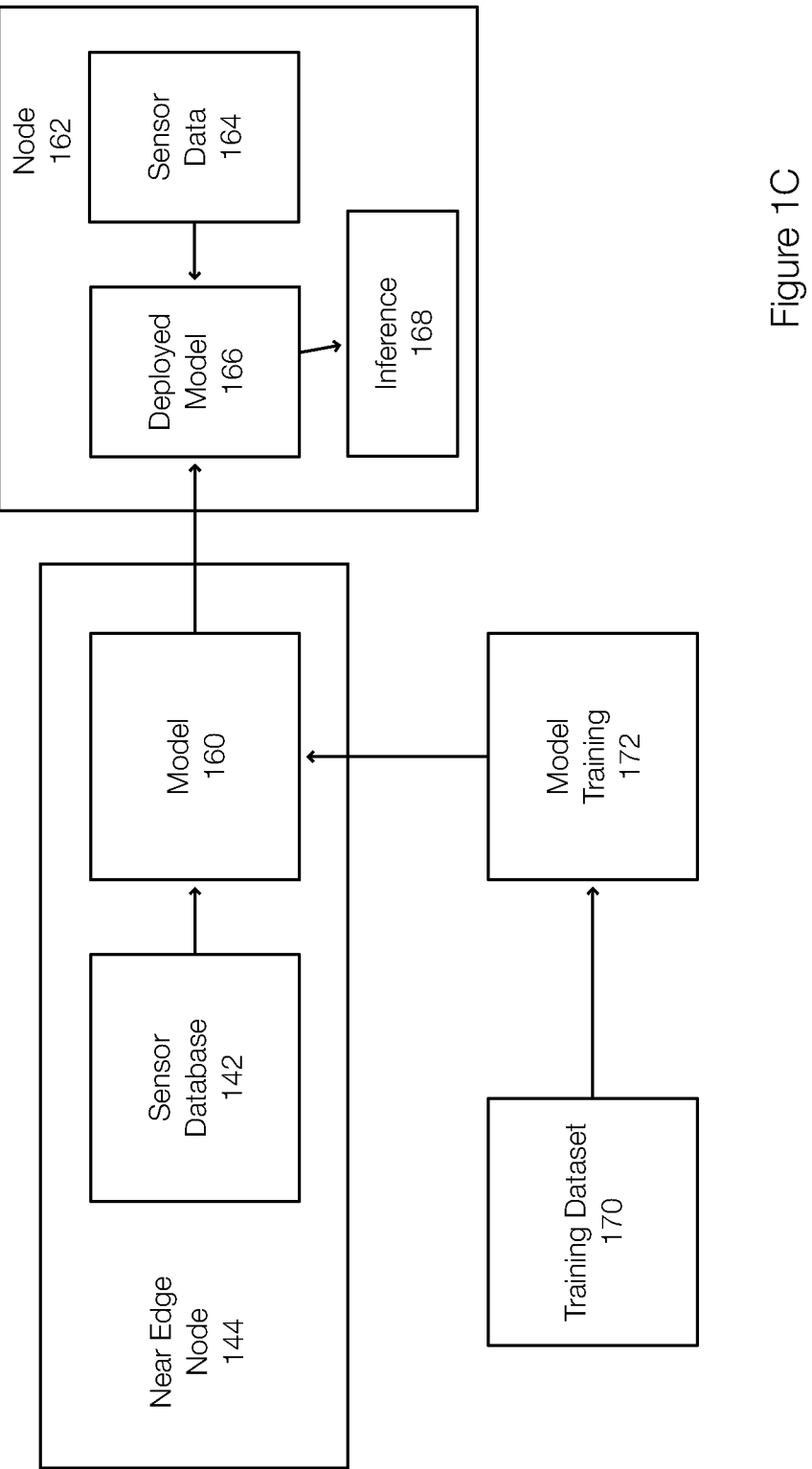
FIG. 1C discloses aspects of training models to be deployed to nodes in an environment.

FIG. 1C discloses aspects of model training and model deployment. In FIG. 1C, a training dataset 170 is used for model training 172. Thus, the model 160 is the result of model training 172 based on the training dataset 170. The training dataset 170 may be generated from historical sensor data, which may be stored in the sensor database. The model 160 can be deployed to the near edge node 144 and generate inferences from sensor data received from nodes in the environment. The model 160 may be deployed to the node 162 as the deployed model 162 and generate an inference 168 based on sensor data 164 generated at the node 162.

The model 160 and the deployed model 166 may generate the same inferences but use different data. The model 160 may have the benefit of generating inferences based on data from multiple nodes while the deployed model 166 only uses data from the node 162. In one example, the model 160 and the model 166 are the same.

The collection of the sensor data 164 at the node 162 may be triggered periodically, by a change in values (e.g., when acceleration or deceleration is detected), periodically, and/or for other reasons. The collected data may be input to the deployed model 166 to generate an inference 168. In some examples, the sensor data 164 is processed to extract features and the features are input to the deployed model 166. Features extracted from the sensor database 142 may be input to the model 160.

As described below, the features used as input to the models may be scored. The feature scores and/or model scores, which are based on the feature scores, may be used to select which models are deployed, determine when models are retrained, replaced, recalled, or the like.

Figure 2A:
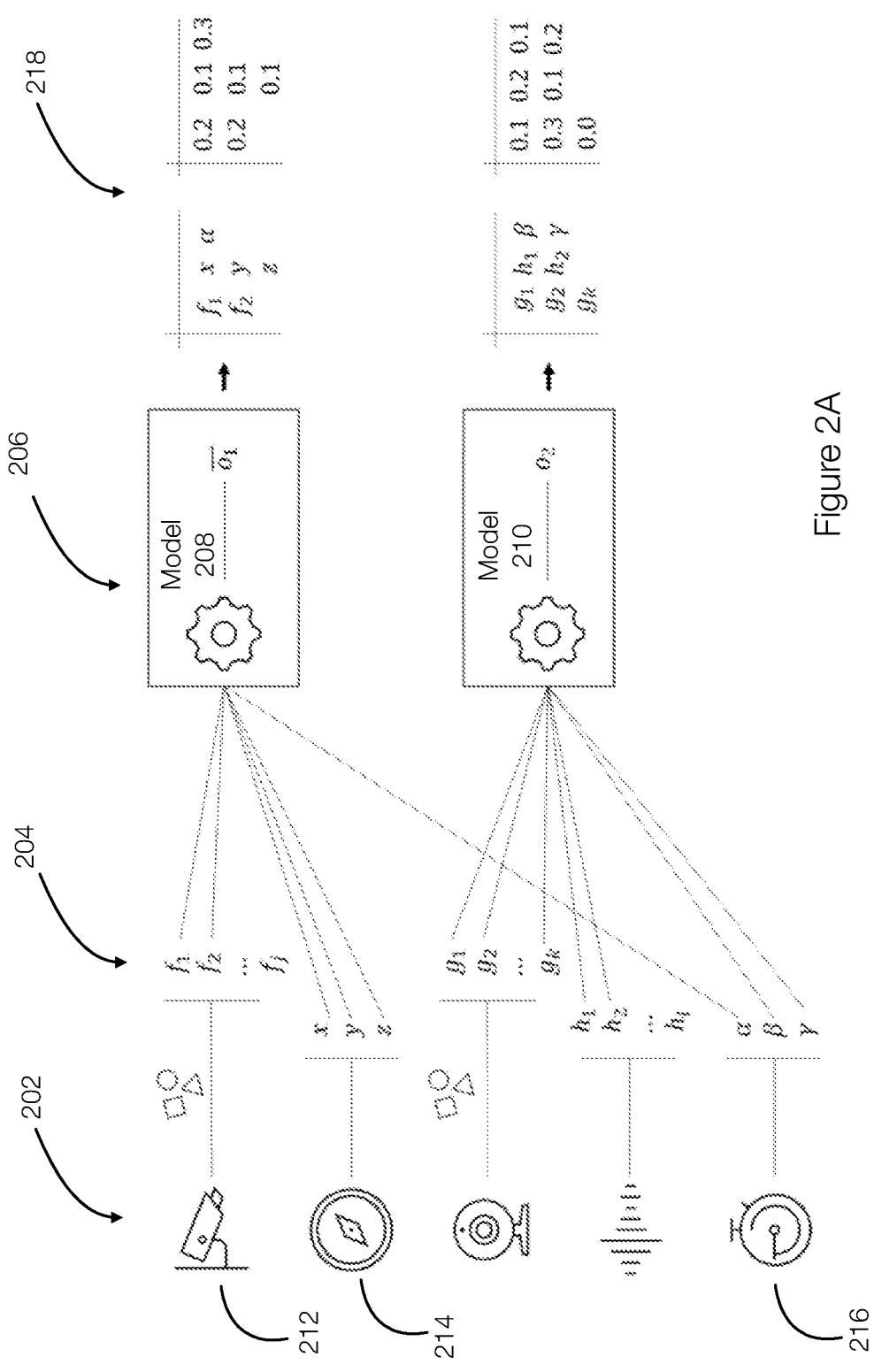
FIG. 2A discloses aspects of training multiple models.

FIG. 2A discloses aspects of determining a feature-based aggregate score for multiple models. The aggregate score may include an importance score and a health score. Generally, a feature is (but is not limited to) a measurable property or characteristic. Features such as x, y, and z coordinates may be features generated or extracted from compass data. Features may be inherent in data or may be generated from the data. In machine learning, features are often used as input to the machine learning model.

FIG. 2A illustrates sensors 202 (e.g., camera, compass, microphone, inertial sensor) and features 204 that are extracted from the data generated by the sensors 202. The sensors 202 may include sensors with different modalities, with multiple features per sensor, with similar modalities but of different type, or the like. For example, the sensors 202 may include fixed cameras, moving cameras, embedded cameras, or the like.

FIG. 2A also illustrates multiple models 206, such as the model 208 and the model 210. The models 206 may receive features or data from multiple sensors as input. Further, the models 206 may receive one or more features from one or more sensors. As illustrated in FIG. 2A, the model 208 receives two features from the sensor 212, all features from the sensor 214, and one feature from the sensor 216. Because the models 208 and 210 have different features as inputs, the outputs or functions of the models 206 may be different. The model 208 may detect potential collision events while the model 210 may detect dangerous cornering events.

When the model 208 is trained, feature importance scores 218 for each of the models 206 is determined. This may be performed in relation to a validation dataset that is gathered separately from a training dataset.

For example, a feature importance score is generated for each of the features input to the model 208. The importance scores 218 sum to 1.0 in one embodiment for each model as the importance scores are normalized. The model 210 receives 7 features as input and feature importance scores are generated for each of these features.

FIG. 2B discloses aspects of a matrix for storing feature importance scores for each of the models. The table 220 reflects the feature importance scores for a set of models (e.g., $M_1 \ldots M_n$). The table 220 also illustrates which features are input to which of the models 206. As illustrated in the table 220, each of the models may receive a different subset of all possible features. In this example, the features received by models $M_1$ and $M_2$ include only one common feature.

In this example, each model has importance scores only for its corresponding input features. The feature importance scores of the feature a, for example, differ for model $M_1$ (0.3) and $M_2$ (0.1). Feature importance can be determined in different manners and normalized. Further, embodiments of the invention may be implemented with different model types including neural network models, ensemble models, probabilistic models, or the like. When the input to the models are features, feature importance can be determined. In other words, the features can be ranked in terms of importance.

Embodiments of the invention may also determine a feature health score for each feature. Some sensors, for example, may be capable of outputting a health score for each feature. For sensors that are not able to output a feature health score, a statistical analysis can be performed on the output of the sensor to identify deviations from normal behavior, which can be converted to a feature health score. This behavior can be taken from technical expectations over values provided by an acceptable entity or inferred from behavior.

Figure 2C:
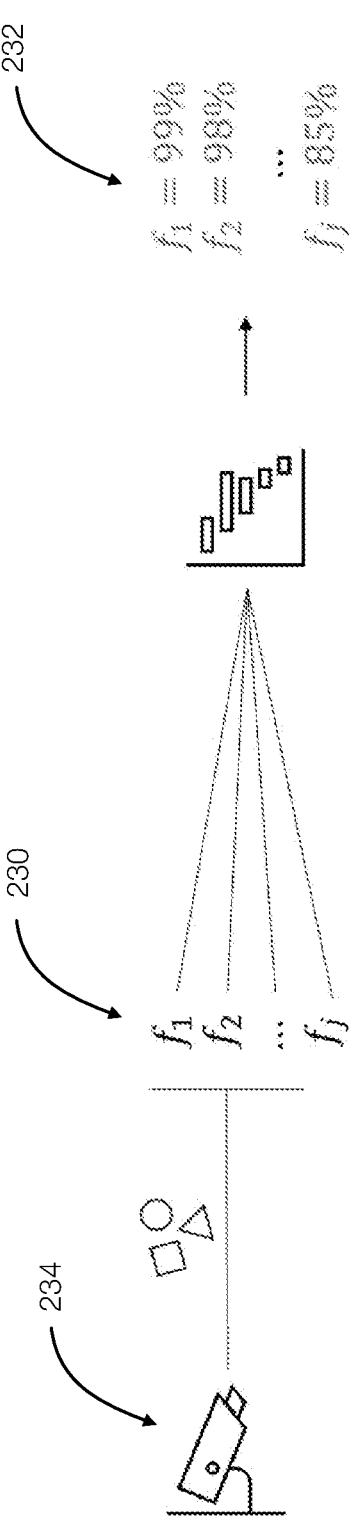
FIG. 2C discloses aspects of feature health scores.

FIG. 2C discloses aspects of feature health scores. FIG. 2C illustrates features 230 of a sensor 234 and corresponding health scores 232. Each of the features 230 may be given a health score separately and independently. If a feature for the sensor 234 is performing poorly, the feature may be excluded from participation in model training/inference even if the feature is an important feature for one or more models. For example, the feature $f_j$ in FIG. 2C may be below a threshold score of 90% and be excluded from consideration by relevant models. This may avoid situations where a low health score adversely impacts model outputs. The health scores 232 may be updated periodically or for other reasons and reconsidered.

As previously described, the feature importance scores and the feature health scores can be combined into an aggregated score. The combination can be performed in various manners and may be weighted. For example, the health score may have a greater weight in the aggregated score. The aggregated score may be generated in different manners.

The aggregated scores of the features can be used to perform model selection. In other words, when the near edge node can select from among multiple models, the model selected and deployed may depend on the aggregated score of each of the model's features.

In one example, the importance scores and health scores are combined into a single vector for each of the models. For example, the importance scores may be represented by a matrix of feature importance scores: $F \in R^{n \times f}$.

The feature health scores may be represented by a matrix of feature health scores: $H \in R^{f \times 1}$. These matrices can be multiplied to arrive at a vector: $\vec{m} \in R^{n \times 1}$, with one score per model. In this example, n is the number of models and f is the number of features (from all sensors). This results in a model score of:

$$\vec{m} = F \cdot H.$$

Once the model score vector is determined, models can be selected based on a threshold basis or a ranking basis. The threshold can be set by an administrator or other person/ entity or by default. The performance of each model may also be measured on a validation data set. This may be used to determine the threshold for the next model selection operation. A model selection operation can be performed periodically or can be triggered based on the overall model performance, the addition of new sensors, or any event that may alter the data streams, when a now model, or the like. In one example, for a particular type of event detected by several models, the model selected and deployed is the model with the best model score. However, this may be adapted in some instances to account for models that may not have access to their most important feature. Multiple factors may be used to select a model for deployment.

Figure 3:
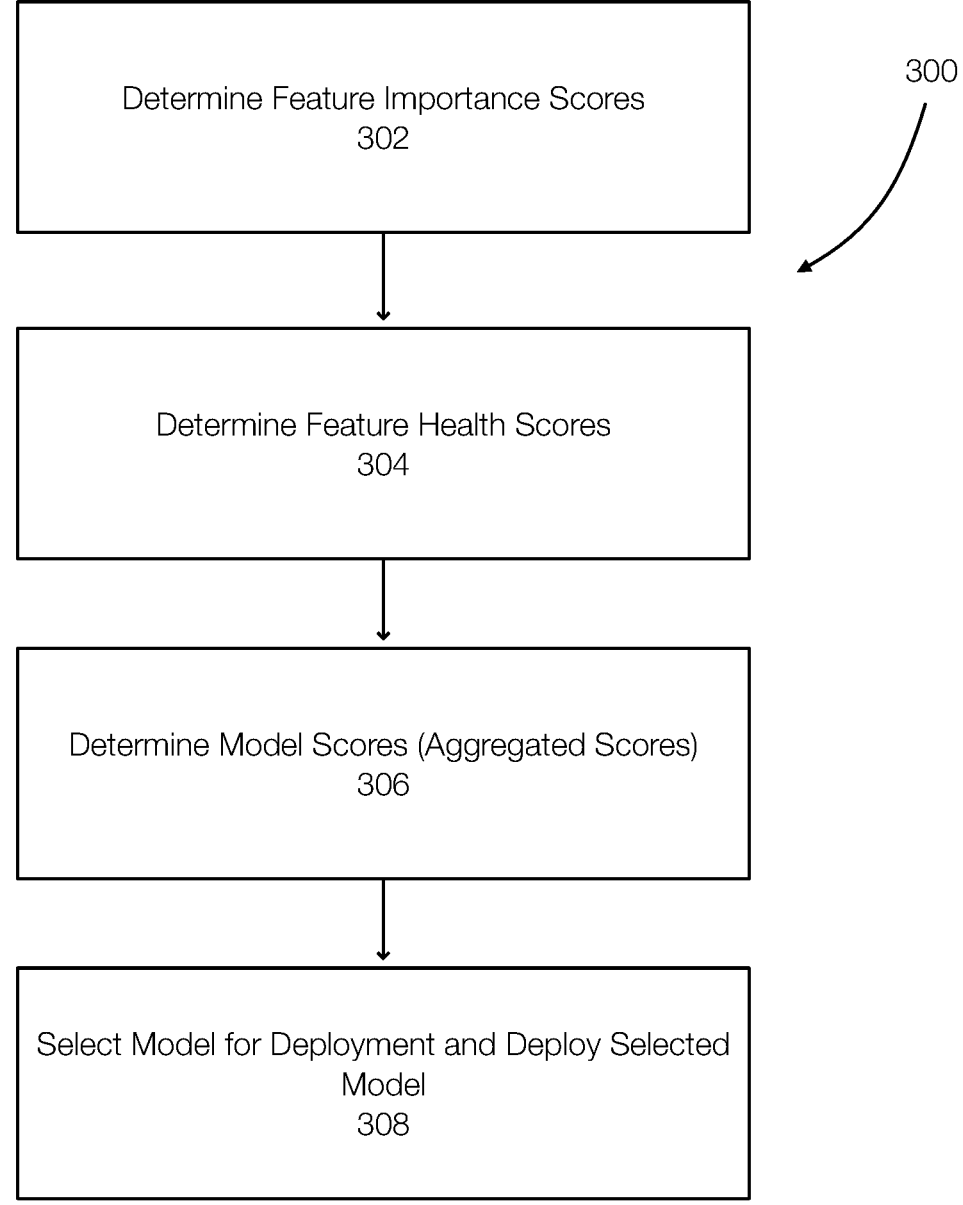
FIG. 3 discloses aspects of selecting a model for deployment to nodes in an environment.

FIG. 3 discloses aspects of a model selection and/or deployment operation. Aspects of the method 300 may be performed at different times or as necessary. In the method 300, feature importance scores are determined 302. The feature importance scores can be determined after a training round and/or prior to deployment. The feature importance scores are determined for the features of each model. Thus, the importance of a feature for one model may be different from the importance score of that feature for another model.

Health scores for each of the features are determined 304. This may be performed periodically or as needed or when triggered. The feature health scores may be provided by the sensors themselves and/or may be determined by a statistical analysis or based on deviations from anticipated normal behavior.

Next, a model score is determined 306. The model score may be a combination of the aggregated scores of the model's features. Thus, the model score is based on the feature importance and feature health scores of the model's features.

Once the model scores are determined, a model can be selected for deployment and deployed 308. Aspects of the model selection operation may be performed at different times. For example, the feature importance scores may be redetermined. If changes are detected in the feature importance scores, the model selection operation may be performed. If changes in the feature health scores are detected, the model selection operation may be triggered. This helps ensure that models deployed to nodes in the network, or operating at a near edge or central node, have an adequate model score (e.g., best available, above a threshold model score, or the like).

Advantageously, this allows event detection (or other functions) to be performed in a manner that accounts for the importance and health of features that are used as input to the deployed models. When features have a poor importance or health or when the importance or health scores change (e.g., below a threshold score), embodiments of the invention can select a different model that uses features with adequate scores. This improves the performance of the models and of event detection in the context of logistics operations such as model selection and event detection.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data protection operations which may include, but are not limited to, data replication operations, IO replication operations, data read/write/delete operations, data deduplication operations, data backup operations, data restore operations, data cloning operations, data archiving operations, and disaster recovery operations. More generally, the scope of the invention embraces any operating environment in which the disclosed concepts may be useful.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include edge environments and may include one or more clients that are capable of collecting, modifying, and creating, data. As such, a particular client may employ, or otherwise be associated with, one or more instances of each of one or more applications that perform such operations with respect to data. Such clients may comprise physical machines, containers, or virtual machines (VMs).

Particularly, devices in the operating environment may take the form of software, physical machines, containers, or VMs, or any combination of these, though no particular device implementation or configuration is required for any embodiment.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing. Data may also include sensor data, features, or the like.

It is noted that any of the disclosed processes, operations, methods, and/or any portion of any of these, may be performed in response to, as a result of, and/or based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

Following are some further example embodiments of the invention. These are presented only by way of example and are not intended to limit the scope of the invention in any way.

Embodiment 1. A method comprising: training models and determining, for each of the models, a feature importance score for each feature of each of the models, determining a feature health score for each feature of each sensor used by each model, determining a model score for each of the models, wherein the model score is an aggregation of the feature importance scores and the feature health scores of the corresponding model, selecting a model from the models based on the model scores, and deploying the selected model to nodes operating in an environment.

Embodiment 2. The method of embodiment 1, further comprising causing the nodes to generate inferences using the deployed selected model.

Embodiment 3. The method of embodiment 1 and/or 2, wherein features having a health score below a threshold score are omitted from an input to the deployed selected model.

Embodiment 4. The method of embodiment 1, 2, and/or 3, further comprising determining the model score by generating a vector for each model, wherein the vector includes feature importance scores and feature health scores of a corresponding model.

Embodiment 5. The method of embodiment 1, 2, 3, and/or 4, wherein the feature importance scores are arranged in a first matrix and the feature health scores are arranged in a second matrix, wherein each vector is a dot product of a corresponding first matrix and a corresponding second matrix, wherein the vector includes a model score for each of the models.

Embodiment 6. The method of embodiment 1, 2, 3, 4, and/or 5, further comprising redetermining the feature importance scores.

Embodiment 7. The method of embodiment 1, 2, 3, 4, 5, and/or 6, further comprising redetermining the feature health scores.

Embodiment 8. The method of embodiment 1, 2, 3, 4, 5, 6, and/or 7, further comprising regenerating the model scores, wherein the deployed selected model is replaced with a new selected model if the new selected model has a higher model score than the deployed selected score.

Embodiment 9. The method of embodiment 1, 2, 3, 4, 5, 6, 7, and/or 8, wherein each of the models receives a subset of features selected from all features of all sensors.

Embodiment 10. The method of embodiment 1, 2, 3, 4, 5, 6, 7, 8, and/or 9, wherein each of the subsets includes one or more features from at least one sensor.

Embodiment 11. The method of embodiment 1, 2, 3, 4, 5, 6, 7, 8, 9, and/or 10, wherein the model score is configured to reduce an influence of features that are faulty, noisy, or missing from inferences generated by the selected deployed model.

Embodiment 12. A method for performing any of the operations, methods, or processes, or any portion of any of these, or any combination thereof disclosed herein.

Embodiment 13. A non-transitory storage medium having stored therein instructions that are executable by one or more hardware processors to perform operations comprising the operations of any one or more of embodiments 1-12. The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed. A node or object may comprise a computer.

As indicated above, embodiments within the scope of the present invention also include computer storage media, which are physical media for carrying or having computer-executable instructions or data structures stored thereon.

Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general-purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term module, component, agent, engine, or the like may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 4:
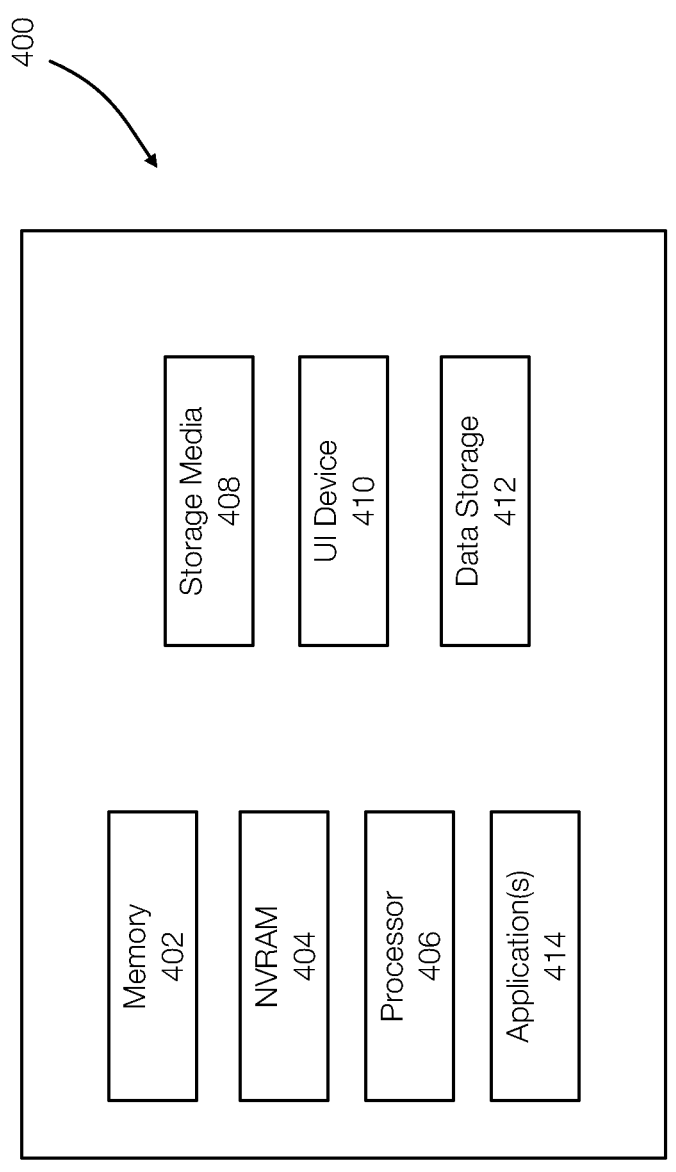
FIG. 4 discloses aspects of a computing device, system, or entity.

With reference briefly now to FIG. 4, any one or more of the entities disclosed, or implied, by the Figures, and/or elsewhere herein, may take the form of, or include, or be implemented on, or hosted by, a physical computing device, one example of which is denoted at 400. As well, where any of the aforementioned elements comprise or consist of a virtual machine (VM), that VM may constitute a virtualization of any combination of the physical components disclosed in FIG. 4.

In the example of FIG. 4, the physical computing device 400 includes a memory 402 which may include one, some, or all, of random access memory (RAM), non-volatile memory (NVM) 404 such as NVRAM for example, read-only memory (ROM), and persistent memory, one or more hardware processors 406, non-transitory storage media 408, UI device 410, and data storage 412. One or more of the memory components 402 of the physical computing device 400 may take the form of solid-state device (SSD) storage. As well, one or more applications 414 may be provided that comprise instructions executable by one or more hardware processors 406 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method performed by one or more processors of a near-edge node operating in communication with multiple sensors and far-edge nodes in an environment, the method comprising:

training models using sensor datasets collected from the multiple sensors associated with objects operating in the environment;

determining, for each of the models, a feature importance score for each feature of sensor outputs from the multiple sensors used as an input to each of the models, wherein each model receives a respective set of features from all possible features from the multiple sensors and a feature importance score for each feature of one model is different from a feature importance score for each feature of another model different from the one model;

determining, by each sensor, a feature health score for each feature of the sensor outputs based on deviations of the sensor outputs from expected normal operating behavior;

determining a model score for each of the models, wherein the model score is an aggregation of the feature importance scores of features, which are received by each model and with a feature health score is higher than a predetermined threshold, and the feature health scores of the corresponding features of the corresponding model such that degraded sensor features contribute reduced weight to the corresponding model score;

selecting a model from the models based on the corresponding model scores above a threshold score; and deploying the selected model from the near-edge node to the far-edge nodes operating in the environment, wherein the selected model is automatically replaced when the feature health score of a feature used by the model falls below a threshold.

2. The method of claim 1, further comprising causing the far-edge nodes to generate inferences using the deployed selected model.

3. The method of claim 2, wherein features having a feature health score below a threshold score are omitted from an input to the deployed selected model.

4. The method of claim 1, further comprising determining the model score by generating a vector for each model, wherein the vector includes feature importance scores and feature health scores of a corresponding model.

5. The method of claim 4, wherein the feature importance scores are arranged in a first matrix and the feature health scores are arranged in a second matrix, wherein each vector is a dot product of a corresponding first matrix and a corresponding second matrix, wherein the vector includes a model score for each of the models.

6. The method of claim 1, further comprising redetermining the feature importance scores.

7. The method of claim 1, further comprising redetermining the feature health scores.

8. The method of claim 1, further comprising regenerating the model scores, wherein the deployed selected model is replaced with a new selected model if the new selected model has a higher model score than the deployed selected model.

9. The method of claim 1, wherein each of the models receives a subset of features selected from all features of all sensors.

10. The method of claim 9, wherein each of the subsets includes one or more features from at least one sensor.

11. The method of claim 10, wherein the model score is configured to reduce an influence of features that are faulty, noisy, or missing from inferences generated by the selected deployed model.

12. A non-transitory storage medium having stored therein instructions that are executable by one or more hardware processors of a near-edge node operating in communication with multiple sensors and far-edge nodes in an environment, the instructions causing the processors to perform operations comprising:

training models using sensor datasets collected from the multiple sensors associated with objects operating in the environment;

determining, for each of the models, a feature importance score for each feature of sensor outputs from the multiple sensors used as an input to each of the models, wherein each model receives a respective set of features from all possible features from the multiple sensors and a feature importance score for each feature of one model is different from a feature importance score for each feature of another model different from the one model;

determining, by each sensor, a feature health score for each feature of the sensor outputs based on deviations of the sensor outputs from expected normal operating behavior;

determining a model score for each of the models, wherein the model score is an aggregation of the feature importance scores of features, which are received by each model and with a feature health score is higher than a predetermined threshold, and the feature health scores of the corresponding features of the corresponding model such that degraded sensor features contribute reduced weight to the corresponding model score;

selecting a model from the models based on the corresponding model scores above a threshold score; and deploying the selected model from the near-edge node to the far-edge nodes operating in the environment, wherein the selected model is automatically replaced when the feature health score of a feature used by the model falls below a threshold.

13. The non-transitory storage medium of claim 12, further comprising causing the far-edge nodes to generate inferences using the deployed selected model.

14. The non-transitory storage medium of claim 13, wherein features having a feature health score below a threshold score are omitted from an input to the deployed selected model.

15. The non-transitory storage medium of claim 12, further comprising determining the model score by generating a vector for each model, wherein each vector includes feature importance scores and feature health scores of a corresponding model.

16. The non-transitory storage medium of claim 15, wherein the feature importance scores are arranged in a first matrix and the feature health scores are arranged in a second matrix, wherein each vector is a dot product of a corresponding first matrix and a second matrix, wherein the vector includes a model score for each of the models.

17. The non-transitory storage medium of claim 12, further comprising redetermining the feature importance scores and/or redetermining the feature health scores.

18. The non-transitory storage medium of claim 12, further comprising regenerating the model scores, wherein the deployed selected model is replaced with a new selected model if the new selected model has a higher model score than the deployed selected model.

19. The non-transitory storage medium of claim 12, wherein each of the models receives a subset of features from all features of all sensors and wherein each of the subsets includes one or more features from at least one sensor.

20. The non-transitory storage medium of claim 19, wherein the model score is configured to reduce an influence of features that are faulty, noisy, or missing from inferences generated by the selected deployed model.

\*   \*   \*   \*   \*